(12) United States Patent
Lee et al.

(10) Patent No.: US 12,216,289 B2
(45) Date of Patent: Feb. 4, 2025

(54) DEVICE AND METHOD FOR ACQUIRING MULTI-LUMINOSITY IMAGES

(71) Applicant: Kyungpook National University Industry-Academic Cooperation Foundation, Daegu (KR)

(72) Inventors: Sung Hak Lee, Daegu (KR); Sun Gon Jun, Busan (KR)

(73) Assignee: KYUNGPOOK NATIONAL UNIVERSITY INDUSTRY—ACADEMIC COOPERATION FOUNDATION, Daegu (KR)

( * ) Notice: Subject to any disclaimer, the term of this patent is extended or adjusted under 35 U.S.C. 154(b) by 490 days.

(21) Appl. No.: 17/634,709

(22) PCT Filed: Aug. 13, 2020

(86) PCT No.: PCT/KR2020/010720
§ 371 (c)(1),
(2) Date: Feb. 11, 2022

(87) PCT Pub. No.: WO2021/034003
PCT Pub. Date: Feb. 25, 2021

(65) Prior Publication Data
US 2022/0283442 A1    Sep. 8, 2022

(30) Foreign Application Priority Data
Aug. 16, 2019 (KR) .................. 10-2019-0100162

(51) Int. Cl.
H04N 23/56 (2023.01)
G02B 5/20 (2006.01)
(Continued)

(52) U.S. Cl.
CPC ......... *G02B 27/1013* (2013.01); *G02B 5/208* (2013.01); *H04N 23/45* (2023.01); *H04N 23/71* (2023.01)

(58) Field of Classification Search
CPC ........ H04N 23/11; H04N 23/75; H04N 23/56; H04N 23/71; H04N 23/45; G03B 11/00; G02B 27/1013
See application file for complete search history.

(56) References Cited

U.S. PATENT DOCUMENTS

2008/0239091 A1 * 10/2008 Soga ................... H04N 23/81
348/222.1

FOREIGN PATENT DOCUMENTS

JP    2006-033716 A    2/2006
KR    100983346 B1    9/2010
(Continued)

OTHER PUBLICATIONS

International Search Report and Written Opinion for International Application No. PCT/KR2020/010720 dated Dec. 1, 2020.

*Primary Examiner* — Ryan D Howard
(74) *Attorney, Agent, or Firm* — Harness, Dickey & Pierce, P.L.C.

(57) ABSTRACT

The present invention relates to a device and a method for acquiring multi-luminosity images, wherein images having multiple luminosities in visible-ray and infrared wavelength domains can be captured and synthesized by using optical filter transmittance adjustment and infrared lighting strength adjustment. The device may comprise: a camera unit for photographing a predetermined subject and acquiring images thereof; a lighting unit disposed on the periphery of the camera unit, the lighting unit comprising a first infrared lamp for modulating and emitting infrared light according to the distance from the subject and a second infrared lamp for modulating and emitting infrared light according to the (Continued)

photography environment; an optical filter unit disposed on the front surface of the camera unit so as to adjust the amount of transmission of light directed to the camera unit; a lamp control unit for controlling the first infrared lamp such that infrared light is modulated on the basis of the distance from the subject; a luminosity multiplexing unit for producing a light multiplexing signal so as to control infrared light modulation by the second infrared lamp and the transmittance of the optical filter unit on the basis of the photography environment; and an image processing unit for synthesizing and processing multiple captured images.

24 Claims, 5 Drawing Sheets

(51) Int. Cl.
    *G02B 27/10*     (2006.01)
    *G03B 11/00*     (2021.01)
    *H04N 23/45*     (2023.01)
    *H04N 23/71*     (2023.01)

(56) References Cited

FOREIGN PATENT DOCUMENTS

| KR | 10-2010-0125675 A | 12/2010 |
| KR | 10-2011-0056096 A | 5/2011 |
| KR | 10-2014-0127631 A | 11/2014 |
| KR | 10-2018-0041494 A | 4/2018 |

\* cited by examiner

[FIG. 1]
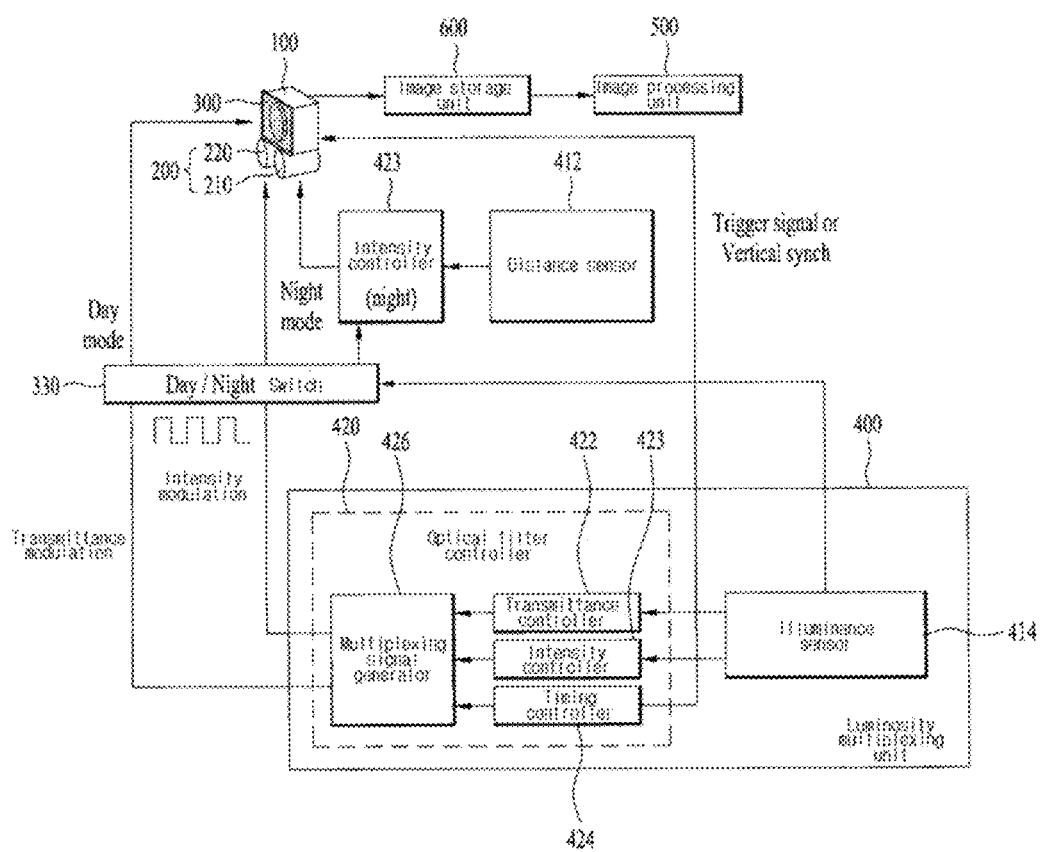

[FIG. 2]
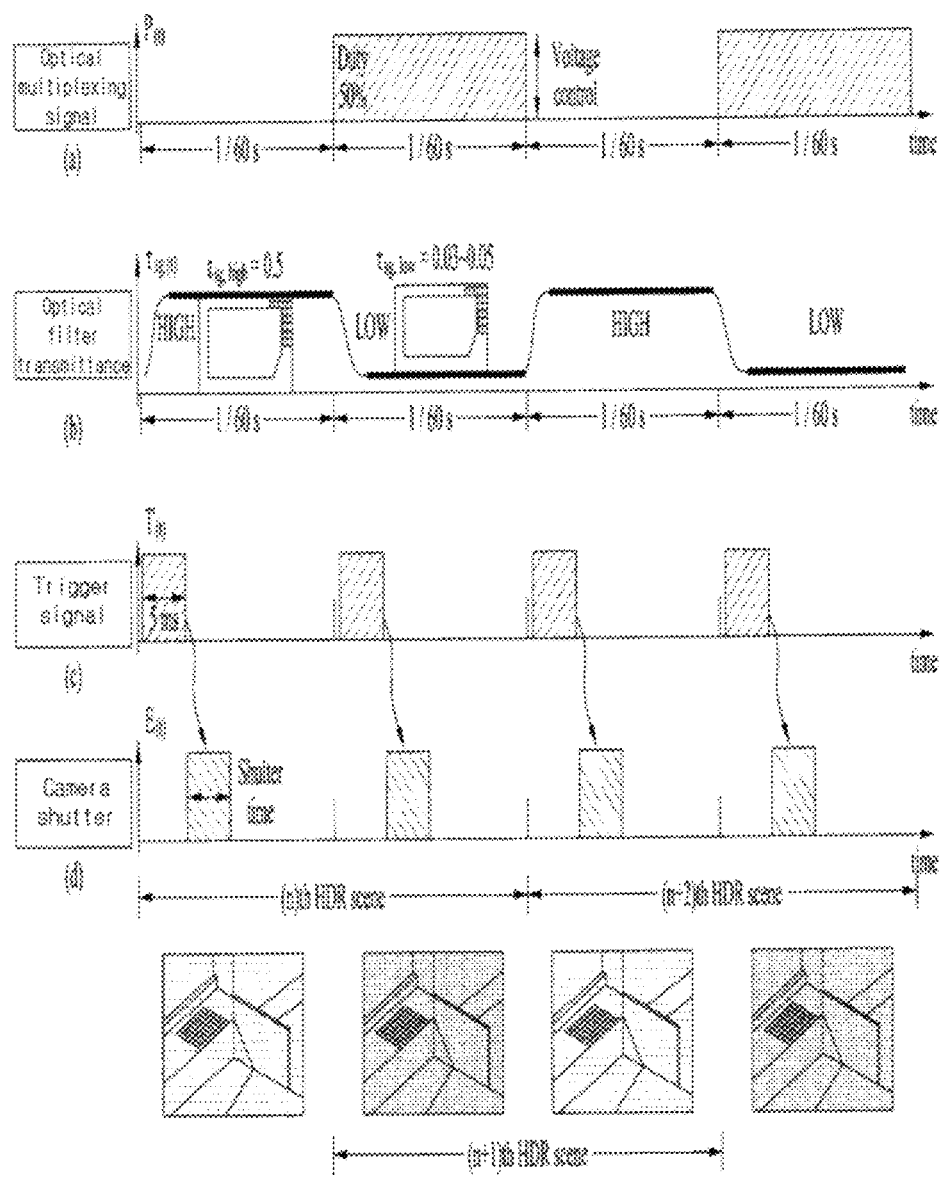

[FIG. 3]
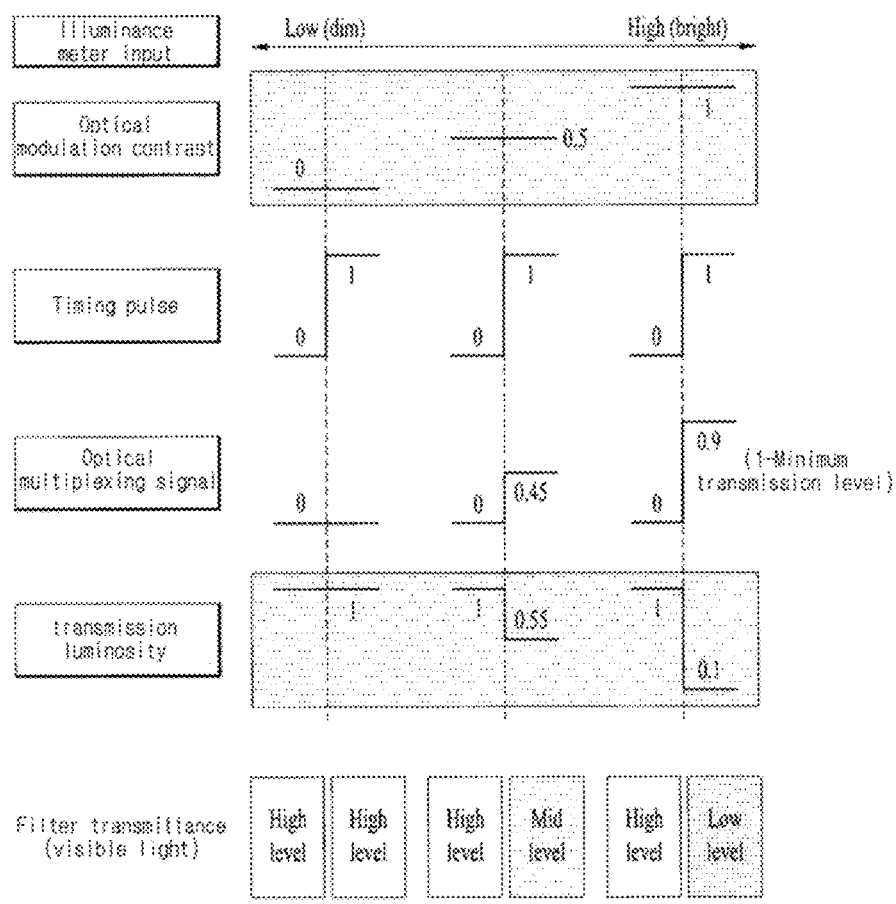

[FIG. 4]
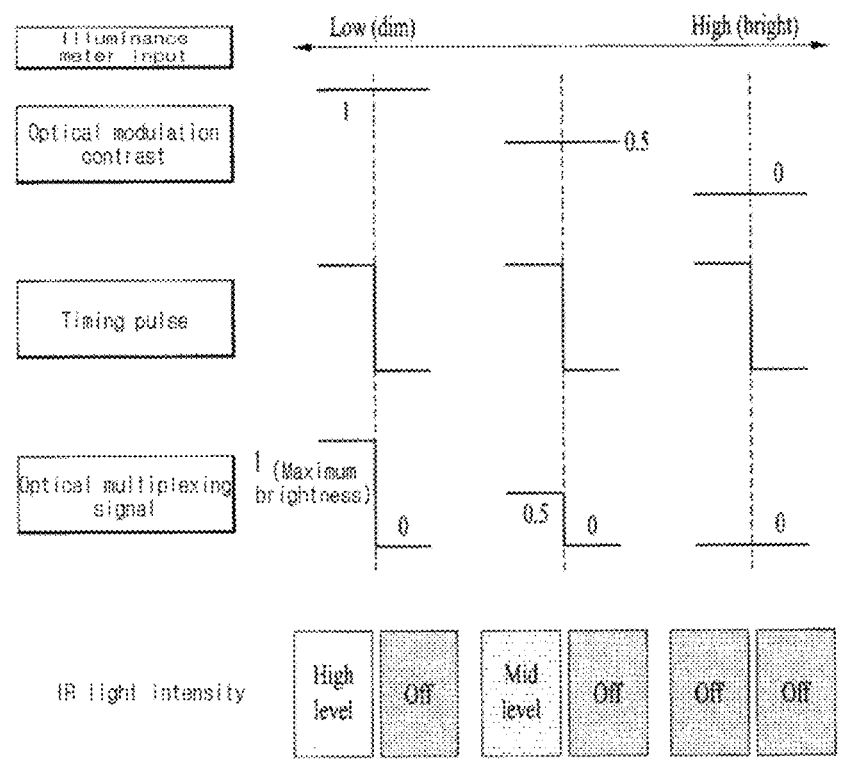

[FIG. 5]
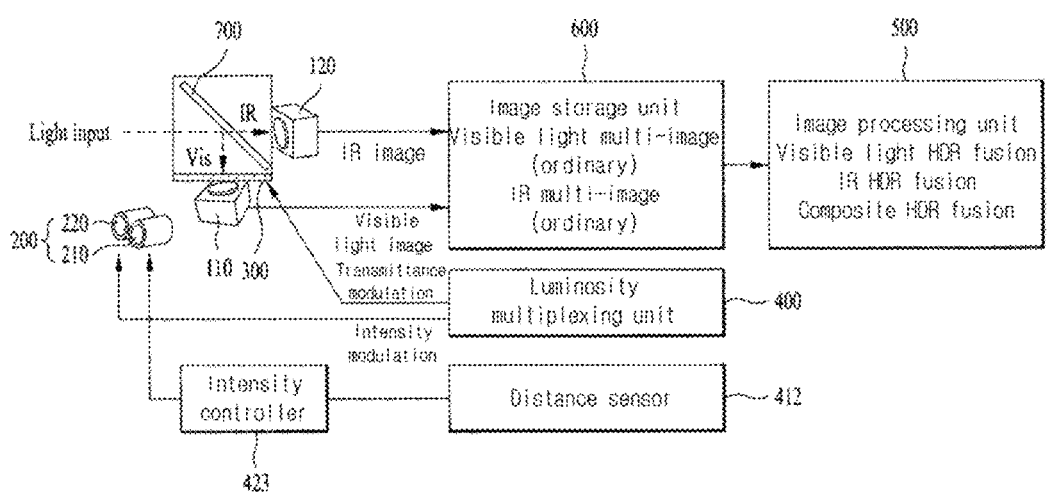

DEVICE AND METHOD FOR ACQUIRING MULTI-LUMINOSITY IMAGES

CROSS-REFERENCE TO RELATED APPLICATIONS

This application is a national phase under 35 U.S.C. § 371 of PCT International Application No. PCT/KR2020/010720 which has an International filing date of Aug. 30, 2020, which claims priority to Korean Application No. 10-2019-0100162, filed Aug. 16, 2019, the entire contents of each of which are hereby incorporated by reference.

TECHNICAL FIELD

The present disclosure relates to a multi-luminosity image acquiring device, and more particularly to a device and method for acquiring a multi-luminosity image capable of shooting and fusing multi-luminosity images in visible and infrared wavelength regions by using transmittance adjustment of an optical filter and intensity adjustment of an infrared lighting.

BACKGROUND ART

To identify outdoor objects in CCTV surveillance cameras, vehicles, robots, drones, etc., camera shooting conditions may generally include daylight conditions from day to night, dark indoors, tunnels, basements, night lights, vehicle headlights, and indoor environments with no light.

Currently, it is a general trend to be converted to HD-class IP cameras according to the consumer demand for high-precision image quality in various environments, and to use LED lights as an auxiliary to increase the sensitivity of a camera sensor or to shoot at night or dark places in a closed space.

Cameras used at night have often used infrared (IR) LED lights that do not have a visual impact for security or crime prevention, and many studies is being carried out to clearly identify objects in a dark space at a low illuminance using a new LED lighting.

Further, a technology to increase a shutter speed using LED flashing synchronized with the camera shooting or to prevent IR oversaturation by detecting a distance from a subject is disclosed in Korean Patent No 10-0983346 (2010 Sep. 20).

However, in the existing technology, it is difficult to adjust the camera and the LED lighting adaptively to a distance and a light amount of a subject in case of sever environmental change such as moving shooting, and the hardware configuration corresponding to various functions may be complicated.

Further, it may be difficult to shoot images at a level that human eyes can perceive and adapt to a luminance condition of wide band and a sudden lighting change experienced in daily life by simply increasing the sensitivity of the camera sensor.

Accordingly, there is a need to develop a multi-luminosity image acquiring device that can be manufactured by easily utilizing an existing low-cost sensor and that can implement image fusing capable of visually identifying and recognizing objects in various lighting environments.

DISCLOSURE

Technical Problem

A technical object intended to be achieved by an embodiment of the present disclosure is to provide a device and method for acquiring a multi-luminosity image capable of implementing an image fusion capable of visually identifying and recognizing objects in various lighting environments by performing a binary luminosity multiplexing method for adjusting a brightness ratio using transmittance adjustment of an optical filter and intensity adjustment of an infrared lighting.

A technical object intended to be achieved by an embodiment of the present disclosure is to also provide a device and method for acquiring a multi-luminosity image capable of being manufactured easily using a low-cost sensor by acquiring distance information from a subject from a distance sensor and acquiring shooting environment information from an illuminance sensor.

The technical objects intended to be achieved by the present disclosure are not limited to those that have been described hereinabove merely by way of example, and other technical objects that are not mentioned can be clearly understood from the following descriptions by those skilled in the art, to which the present disclosure pertains.

Technical Solution

In order to solve the above technical problems, in one aspect of the present disclosure, there is provided a multi-luminosity image acquiring device comprising a camera unit configured to shoot a predetermined subject and acquire an image, a lighting unit disposed around the camera unit, the lighting unit including a first infrared lamp configured to modulate and emit infrared light depending on a distance from the subject, and a second infrared lamp configured to modulate and emit the infrared light depending on a shooting environment, an optical filter unit disposed on a front surface of the camera unit and configured to adjust a transmission amount of light incident on the camera unit, a lamp controller configured to control the first infrared lamp to modulate the infrared light based on the distance from the subject, a luminosity multiplexing unit configured to generate an optical multiplexing signal that modulates the infrared light of the second infrared lamp and controls a transmittance of the optical filter unit based on the shooting environment, and an image processing unit configured to fuse and process the multiple shooting images.

In another aspect of the present disclosure, there is provided a multi-luminosity image acquiring device comprising a camera unit configured to shoot a predetermined subject and acquire an image, a lighting unit disposed around the camera unit, the lighting unit including a first infrared lamp configured to modulate and emit infrared light depending on a distance from the subject, and a second infrared lamp configured to modulate and emit the infrared light depending on a shooting environment, an optical filter unit disposed on a front surface of the camera unit and configured to adjust a transmission amount of light incident on the camera unit, a lamp controller configured to control the first infrared lamp to modulate the infrared light based on the distance from the subject, a luminosity multiplexing unit configured to generate an optical multiplexing signal that modulates the infrared light of the second infrared lamp and controls a transmittance of the optical filter unit based on the shooting environment, and an image processing unit configured to fuse and process the multiple shooting images, wherein the camera unit includes a single broadband camera configured to shoot a broadband image including both visible light and infrared light, and the optical filter unit includes a fixed optical filter that is disposed on a front surface of the single broadband camera and adjusts a transmission amount of incident visible light.

In another aspect of the present disclosure, there is provided a multi-luminosity image acquiring device comprising a camera unit configured to shoot a predetermined subject and acquire an image, a lighting unit disposed around the camera unit, the lighting unit including a first infrared lamp configured to modulate and emit infrared light depending on a distance from the subject, and a second infrared lamp configured to modulate and emit the infrared light depending on a shooting environment, an optical filter unit disposed on a front surface of the camera unit and configured to adjust a transmission amount of light incident on the camera unit, a lamp controller configured to control the first infrared lamp to modulate the infrared light based on the distance from the subject, a luminosity multiplexing unit configured to generate an optical multiplexing signal that modulates the infrared light of the second infrared lamp and controls a transmittance of the optical filter unit based on the shooting environment, and an image processing unit configured to fuse and process the multiple shooting images, wherein the camera unit includes a beam splitter configured to split incident light into a visible light band and an infrared light band, a first camera configured to shoot a multi-light image of the split visible light band, and a second camera configured to shoot a multi-light image of the split infrared light band, and the optical filter unit includes a fixed optical filter that is disposed between a light splitting surface of the beam splitter and the first camera and adjusts a transmission amount of visible light incident on the first camera.

In another aspect of the present disclosure, there is provided a method of acquiring a multi-luminosity image of a multi-luminosity image acquiring device including a camera unit, a lighting unit including a first infrared lamp and a second infrared lamp, a lamp controller, an image processing unit, and a luminosity multiplexing unit, the method comprising a step in which the luminosity multiplexing unit checks whether an image shooting request is received, a step in which the luminosity multiplexing unit acquires ambient illuminance information when the image shooting request is received, a step in which the luminosity multiplexing unit calculates an optical multiplexing signal function for controlling a transmittance of an optical filter unit or an optical multiplexing signal function for controlling an infrared light modulation of the second infrared lamp based on the ambient illuminance information to generate an optical multiplexing signal, a step in which a day/night switch is switched to a day mode or a night mode depending on the ambient illuminance information, a step in which when the day/night switch is switched to the day mode, the optical filter unit modulates a transmittance of light incident in response to the optical multiplexing signal, and when the day/night switch is switched to the night mode, the second infrared lamp modulates and emits infrared light in response to the optical multiplexing signal and the first infrared lamp modulates and emits the infrared light correspondingly to a distance from a subject in response to a control signal of the lamp controller, a step in which the camera unit shoots multi-luminosity images for time required to modulate the transmittance of the optical filter unit or for time required to modulate and emit the infrared light of the first and second infrared lamps, and a step in which the image processing unit fuses and processes the multi-luminosity shooting images.

Advantageous Effects

Effects of a device and method for acquiring a multi-luminosity image according to the present disclosure are described as follows.

The present disclosure can implement an image fusion capable of visually identifying and recognizing objects in various lighting environments by performing a binary luminosity multiplexing method for adjusting a brightness ratio using transmittance adjustment of an optical filter and intensity adjustment of an infrared lighting.

The present disclosure can be manufactured easily using a low-cost sensor by acquiring distance information from a subject from a distance sensor and acquiring shooting environment information from an illuminance sensor.

The present disclosure can overcome a phenomenon of underexposure or partial overexposure of light experienced in an image in various environments such as day and night by acquiring a composite band multi-image using a modulation in a light intensity of a visible band and a near-infrared band and fusing it and a high dynamic range (HDR) visual image.

The present disclosure can respond in real time to changes in external light in various places by proposing a method for modulating an intensity of shooting incident light using the control of a light-adaptive optical filter and an IR lamp.

The present disclosure can be easily extended and grafted to a mobile camera system that can be mounted on vehicles, robots, drones, etc. as well as fixed CCTV cameras and can be manufactured at low cost.

As described above, the present disclosure can acquire a wide dynamic range (WDR) image in multi-intensity and band for visible light and IR light together with fixed and mobile surveillance camera systems and can be actively used in various image visualization fields including a recently emerging field of object recognition, such as various image signal processing fields to express, autonomous vehicles, and unmanned drones.

In particular, a change in external light generated while shooting an autonomous driving image may frequently occur when it is outside a recognition range of a general sensor, for example, when entering or escaping an underground or a tunnel, or when looking out from the inside or in the opposite situation, or when there is a change in a strong vehicle headlight in a dark parking lot.

A sensor-based driving situation detection area in an autonomous vehicle system is a process of recognizing the external environment, and is an essential element for recognizing a fixed or moving object or recognizing a path.

In this instance, the protection of life and property by recognizing unexpected situations occurring in real time and preventing collisions should be prioritized over any other advanced functions.

In addition, the present disclosure can meet a need for surveillance and security that is increasing worldwide due to the currently increasing social tension and crime and can implement a high efficiency video surveillance system.

The present disclosure can be utilized in social crime prevention, industry, and broadcasting fields.

That is, the present disclosure can be utilized in the industrial field in which security CCTV, vehicle-mobile phone-drone camera, black box market, and image sensors are utilized, and can also be utilized in the field of image signal processing based on video or in the field of image signal processing for broadcasting.

In addition, the present disclosure can be utilized in related studies and research fields.

That is, the present disclosure will contribute to the development of intelligent image analysis technology such as image fusion field, object search, face search, environment monitoring, etc., can be utilized as an alternative technology capable of improving the hardware performance of the existing limited performance image sensor, can help the development of related technologies in the future as research result data and simulation data in the form of reports and thesis, and is expected to be utilized in high-tech fields such as airports, ports, military facilities, and construction sites.

Additional scope of applicability of the present disclosure will become apparent from the detailed description given blow. However, it should be understood that the detailed description and specific examples such as embodiments of the present disclosure are given merely by way of example, since various changes and modifications within the spirit and scope of the present disclosure will become apparent to those skilled in the art from the detailed description.

DESCRIPTION OF DRAWINGS

FIG. 1 is a block configuration diagram for describing a multi-luminosity image acquiring device according to an embodiment of the present disclosure.

FIG. 2 is a timing diagram illustrating transmittance adjustment of an optical filter by an optical multiplexing signal and an image capture sequence of a camera.

FIG. 3 illustrates a level multiplexing process for image multiplexing corresponding to visible light in a day mode.

FIG. 4 illustrates a level multiplexing process for multiplexing a composite image corresponding to visible light and infrared light in a night mode.

FIG. 5 is a block configuration diagram for describing a multi-luminosity image acquiring device according to another embodiment of the present disclosure.

MODE FOR INVENTION

Reference will now be made in detail to embodiments of the disclosure, examples of which are illustrated in the accompanying drawings.

A suffix such as "module" and "unit" for the component used in the following description is merely intended to facilitate description of the present disclosure, and the suffixes "module" and "unit" may be mixed and used.

Furthermore, embodiments of the present disclosure will be described in detail with reference to the accompanying drawings and the descriptions of the accompanying drawings, but the present disclosure is not limited or restricted by the embodiments.

Terms used in the present disclosure has been chosen as currently widely used general terms as possible while considering its function in the present disclosure, but may vary depending on the intention or custom of a person skilled in the art or the emergence of new technology. In certain cases, there are also terms arbitrarily selected by the applicant, and in this case, the meaning will be described in the description of the relevant invention. Accordingly, it is intended to clarify that terms used in the present disclosure should be interpreted based on the actual meaning of terms and the contents throughout the present disclosure, rather than the names of simple terms.

FIG. 1 is a block configuration diagram for describing a multi-luminosity image acquiring device according to an embodiment of the present disclosure.

As illustrated in FIG. 1, the present disclosure may include a camera unit 100, a lighting unit 200, an optical filter unit 300, a luminosity multiplexing unit 400, an image storage unit 600, and an image processing unit 500.

The camera unit 100 may shoot a predetermined subject to acquire an image.

For example, the camera unit 100 may include a broadband camera that shoots a broadband image including both visible light and infrared light.

The camera unit 100 may shoot a multi-light image of a visible light band or a multi-light image of an infrared light band depending on a shooting environment.

The camera unit 100 may shoot the multi-light image of the visible light band when a measured illuminance is greater than or equal to a predetermined illuminance in the shooting environment, and may shoot the multi-light image of the infrared light band when the measured illuminance is less than the predetermined illuminance in the shooting environment.

Next, the lighting unit 200 includes a first infrared lamp 210 that modulates and emits infrared light depending on a distance from the subject, and a second infrared lamp 220 that modulates and emits the infrared light depending on the illuminance environment. The lamps 210 and 220 may be disposed around the camera unit 100.

The first infrared lamp 210 may be a brightness adjustment infrared lamp to which DC power is supplied without signal input for shooting synchronization with the camera unit 100.

For example, the first infrared lamp 210 may increase an optical modulation contrast by reducing a brightness of infrared light as the distance from the subject decreases, and may reduce an optical modulation contrast by increasing a brightness of infrared light as the distance from the subject increases.

The second infrared lamp 220 may be a lighting infrared lamp that is turned on to shoot a distant subject of the camera unit 100 and is turned off to shoot a near subject of the camera unit 100 depending on the signal input for shooting synchronization with the camera unit 100.

The second infrared lamp 220 may emit infrared light modulated depending on an ambient illuminance in the shooting environment.

In this instance, the second infrared lamp 220 may increase an optical modulation level of the infrared light as the ambient illuminance decreases, and may reduce the optical modulation level of the infrared light as the ambient illuminance increases.

Next, the optical filter unit 300 may be disposed on a front surface of the camera unit 100 to adjust a transmission amount of light incident on the camera unit 100.

The optical filter unit 300 may be a fixed optical filter that is disposed on a front surface of a single broadband camera corresponding to the camera unit 100 and adjusts a transmission amount of incident visible light.

For example, the fixed optical filter basically uses a liquid crystal (LC) filter capable of varying a transmittance depending on an applied voltage, but all electro-optical devices in which a transmittance is controlled are applicable.

An embodiment of the present disclosure may include a lamp controller that controls the first infrared lamp 210 to modulate infrared light based on a distance from the subject.

The lamp controller may include a distance sensor 412 for sensing a distance from the subject, and an intensity controller 423 for controlling the first infrared lamp 210 to modulate an intensity of infrared light based on the distance from the subject.

For example, the distance sensor 412 may include at least one of a time of flight (ToF)(or infrared) sensor and an ultrasonic sensor, but is not limited thereto.

The intensity controller 423 may be turned off in a day mode in which the measured illuminance is greater than or equal to the predetermined illuminance in the shooting environment, and may be turned on in a night mode in which the measured illuminance is less than the predetermined illuminance in the shooting environment to control the first infrared lamp 210.

Next, the luminosity multiplexing unit 400 may generate an optical multiplexing signal to control infrared light modulation of the second infrared lamp 220 and a transmittance of the optical filter unit 300 based on the shooting environment.

The luminosity multiplexing unit 400 may include an illuminance sensor 414 for sensing the ambient illuminance in the shooting environment, and a controller 420 that generate the optical multiplexing signal to control the infrared light modulation of the second infrared lamp 220 and the transmittance of the optical filter unit 300 based on the ambient illuminance.

For example, the illuminance sensor 414 may include at least one of a cadmium sulfide (CdS) element and a solar cell panel, but is not limited thereto.

The controller 420 may include a transmittance controller 422 for controlling the transmittance of the optical filter unit 300 based on the ambient illuminance, the intensity controller 423 for controlling the second infrared lamp 220 to modulate the intensity of infrared light based on the ambient illuminance, a timing controller 424 for controlling signal timing to synchronize a shooting period of the camera unit 100, an infrared light modulation period of the second infrared lamp 220, and a transmittance change period of the optical filter unit 300, and a multiplexing signal generator 426 for generating an optical multiplexing signal in response to control signals of the transmittance controller 422, the intensity controller 423, and the timing controller 424.

When the luminosity multiplexing unit 400 generates the optical multiplexing signal, the luminosity multiplexing unit 400 may calculate an optical modulation contrast value for controlling the transmittance of the optical filter unit 300 or an optical modulation contrast value for controlling the infrared light modulation of the second infrared lamp 220 based on the ambient illuminance of the shooting environment, may generate a timing pulse for synchronizing the shooting period of the camera unit 100 with the transmittance change period of the optical filter unit 300 or a timing pulse for synchronizing the shooting period of the camera unit 100 with the infrared light modulation period of the second infrared lamp 220, may calculate a minimum transmission level corresponding to the ambient illuminance or a maximum brightness level of infrared light, may calculate an optical multiplexing signal function based on the optical modulation contrast value, the timing pulse, and the minimum transmission level or the maximum brightness level of infrared light, and may generate an optical multiplexing signal based on the calculated optical multiplexing signal function.

For example, when the luminosity multiplexing unit 400 calculates the optical multiplexing signal function, the luminosity multiplexing unit 400 may recognize the day mode when the ambient illuminance in the shooting environment is greater than or equal to the predetermined illuminance, may calculate the optical modulation contrast value for controlling the transmittance of the optical filter unit 300 based on the ambient illuminance when the day mode is recognized, may generate the timing pulse for synchronizing the shooting period of the camera unit 100 with the transmittance change period of the optical filter unit 300, may calculate the minimum transmission level corresponding to the ambient illuminance, may calculate the optical multiplexing signal function based on the optical modulation contrast value, the timing pulse, and the minimum transmission level, and may generate the optical multiplexing signal based on the calculated optical multiplexing signal function.

The minimum transmission level may be a lowest transmittance ratio that is relatively set with respect to a maximum open transmittance of the optical filter unit during the daytime.

In this instance, the luminosity multiplexing unit 400 may calculate the optical multiplexing signal function of the day mode using an equation of 'optical multiplexing signal function=(1−minimum transmission level)×(timing pulse)×(optical modulation contrast value)'.

Further, when the luminosity multiplexing unit 400 calculates the optical multiplexing signal function, the luminosity multiplexing unit 400 may recognize the night mode when the ambient illuminance in the shooting environment is less than the predetermined illuminance, may calculate the optical modulation contrast value for controlling the infrared light modulation of the second infrared lamp 220 based on the ambient illuminance when the night mode is recognized, may generate the timing pulse for synchronizing the shooting period of the camera unit 100 with the infrared light modulation period of the second infrared lamp 220, may calculate the maximum brightness level of infrared light, may calculate the optical multiplexing signal function based on the optical modulation contrast value, the timing pulse, and the maximum brightness level of infrared light, and may generate the optical multiplexing signal based on the calculated optical multiplexing signal function.

The luminosity multiplexing unit 400 may calculate the optical multiplexing signal function using an equation of 'optical multiplexing signal function=(maximum brightness level of infrared light)×(timing pulse)×(optical modulation contrast value)'.

An embodiment of the present disclosure may further include a day/night switch 330 that is switched to the day mode, in which the transmittance of the optical filter unit 300 is controlled, or is switched to the night mode, in which the infrared light modulation of the first and second infrared lamps 210 and 220 is controlled, depending on the object distance and ambient illuminance in the shooting environment.

The day/night switch 330 may be switched to the day mode so that when the day mode is switched on, the day/night switch 330 applies the optical multiplexing signal generated by the luminosity multiplexing unit 400 to the optical filter unit 300 when the ambient illuminance in the shooting environment is greater than or equal to the predetermined illuminance, and controls the transmittance of the optical filter unit 300.

The day/night switch 330 may be switched to the night mode so that when the night mode is switched on, the day/night switch 330 applies the optical multiplexing signal generated by the luminosity multiplexing unit 400 to the second infrared lamp 220 when the ambient illuminance in the shooting environment is less than the predetermined illuminance to control the infrared light modulation of the second infrared lamp 220, and applies a switching signal to the intensity controller 423 of the lamp controller to control the infrared light modulation of the first infrared lamp 210.

Next, the image storage unit 600 may store at least one of a multi-light image of a visible light band and a multi-light image of an infrared light band that are shot by the camera unit 100.

The image processing unit 500 may fuse and process one of multi-light images of a visible light band, multi-light images of an infrared light band, and multi-light images of a composite band including both visible light and infrared light according to the shooting environment.

For example, the shooting environment may include a first shooting environment in which a daylight condition is daytime, a second shooting environment that is night time of a dark or weak lighting condition, and a third shooting environment which is a moving shooting condition or an ordinary condition with a condition in which there is a severe change in lighting and external light.

The image processing unit 500 may fuse and process a high exposure image and a low exposure image from multi-light images of the visible light band when the shooting environment is the first shooting environment, may fuse and process a high exposure image and a low exposure image from multi-light images of the infrared light band when the shooting environment is the second shooting environment, and may fuse and process a high exposure image and a low exposure image from multi-light images of the composite band including both visible light and infrared light when the shooting environment is the third shooting environment.

As described above, the embodiment illustrated in FIG. 1 may apply a single sensor (broadband) camera, use the timing control to synchronize IR lamps, and use both a lighting IR lamp and an adjustable IR lamp.

The embodiment illustrated in FIG. 1 in the day mode may adjust the transmittance of the optical filter so that a ratio of brightness of a bright area of a low-transmission image to a dark area of a high-transmission image is reduced. Further, the embodiment illustrated in FIG. 1 in the night mode may adjust a ratio of brightness of a near subject and a distant subject to decrease using the intensity adjustment of infrared light of the infrared lamp.

In the embodiment illustrated in FIG. 1, the optical filter may be used only for the modulation of the amount of light incident on the single sensor, the luminosity multiplexing unit may additionally include an IR lamp intensity controller, and the day mode operation or the nigh mode operation may be switched depending on the ambient illuminance using an illumination sensor.

In the day mode, all the IR lamps may be turned off, and in the night mode, power is not supplied to the optical filter, and a maximum transmittance state may be maintained.

The controller for controlling the optical filter and the lamp multiplexes the transmittance of the optical filter to the camera using a timing signal (trigger signal or vertical synch signal) for synchronization in the day mode, and multiplexes the IR transmission light level in the night mode.

This method may be applied to a camera built-in IR lamp structure.

The IR lamp is comprised of an adjustable IR lamp and a lighting IR lamp. The brightness of the adjustable IR lamp is adjusted to a level at which a near or distant subject is identified according to distance sensor information within a measurement range (no need for camera synchronization). The lighting IR lamp is adjusted to turn on (shooting the distant subject) and off (shooting the near subject) during the shooting period. Hence, the IR lamp may be alternately turned on and off at two levels of high and low levels when compositely considering the adjustable IR lamp and the lighting IR lamp.

An image may be fused by acquiring color information and near subject outline information at a low level and acquiring distant subject outline information at a high level.

FIG. 2 is a timing diagram illustrating transmittance adjustment of an optical filter by an optical multiplexing signal and an image capture sequence of a camera. FIG. 3 illustrates a level multiplexing process for image multiplexing corresponding to visible light in a day mode.

More specifically, FIG. 2 is a conceptual diagram of visible light multi-image shooting in the day mode. (a) of FIG. 2 illustrates an optical multiplexing signal for 60 Hz double exposure shooting of a visible light image, and (b) of FIG. 2 illustrates a light transmittance change sequence of the optical filter with respect to the optical multiplexing signal.

As illustrated in FIG. 2, when a voltage is not applied to the optical filter, it shows about 50% light transmittance (high region), and the light transmittance is reduced (low region) as the voltage increases.

When the voltage is adjusted so that a light transmittance of the low region is about 3% to about 5%, a light exposure ratio of two images may be about 10:1.

In this case, the camera may alternately shoot an image for two exposure states during one cycle of optical modulation.

Since the image processing unit fuses two frames of a high dynamic range (HDR) image at one frame interval, a frame rate may be maintained.

In addition, a level difference of the optical multiplexing signal may be adjusted differently with respect to a change in the brightness of the shooting environment obtained by illuminometer signal information.

As the illuminance meter, a cadmium sulfide (CdS) element and a solar cell panel, or the like may be used.

As illustrated in FIG. 3, the present disclosure has a maximum optical modulation contrast in a bright environment (high light amount), and can compensate for an insufficient amount of light by reducing an optical modulation contrast as the environment becomes darker (low light amount). However, this can be set as an optional function.

In addition, a function for the optical multiplexing signal in the day mode is as shown in Equation 1 below.

$$\text{Optical multiplexing signal function} = (1 - \text{minimum transmission level}) \times (\text{timing pulse}) \times (\text{optical modulation contrast value}) \quad \text{[Equation 1]}$$

Here, the minimum transmission level may be a lowest transmittance ratio that is relatively set with respect to a maximum open transmittance of the optical filter during the daytime.

FIG. 4 illustrates a level multiplexing process for multiplexing a composite image corresponding to visible light and infrared light in a night mode.

More specifically, FIG. 4 illustrates an optical modulation method of a lighting IR lamp depending on the shooting environment in a night mode. As illustrated in FIG. 4, the present disclosure increases an IR lamp modulation contrast as an illuminance environment becomes darker, reduces the IR lamp modulation contrast as the illuminance environment becomes brighter, and turns off the lamp without changing the IR lamp modulation contrast when the illuminance environment is greater than or equal to a predetermined level.

Further, a function for the optical multiplexing signal in the night mode is as shown in Equation 2 below.

$$\text{Optical multiplexing signal function} = (\text{IR maximum brightness level}) \times (\text{timing pulse}) \times (\text{optical modulation contrast}) \quad \text{[Equation 2]}$$

FIG. 5 is a block configuration diagram for describing a multi-luminosity image acquiring device according to another embodiment of the present disclosure.

As illustrated in FIG. 5, the present disclosure may include a camera unit 100, a lighting unit 200, an optical filter unit 300, a luminosity multiplexing unit 400, an image storage unit 600, and an image processing unit 500.

The camera unit 100 may shoot a predetermined subject to acquire an image.

For example, the camera unit 100 may include a beam splitter 700 that splits incident light into visible light and infrared light, a first camera 110 for shooting a multi-light image of a split visible light band, and a second camera 120 for shooting a multi-light image of a split infrared light band.

The optical filter unit 300 may include a fixed optical filter that is disposed between a light splitting surface of the beam splitter 700 and the first camera 110 and adjusts a transmission amount of visible light incident on the first camera 110.

For example, the fixed optical filter basically uses a liquid crystal (LC) filter capable of varying a transmittance depending on an applied voltage, but all electro-optical devices in which a transmittance is controlled are applicable.

The first and second cameras 110 and 120 may be arranged perpendicular to each other with respect to the light splitting surface of the beam splitter 700.

Next, the lighting unit 200 includes a first infrared lamp 210 that modulates and emits infrared light depending on a distance from the subject, and a second infrared lamp 220 that modulates and emits the infrared light depending on a shooting environment. The lamps 210 and 220 may be disposed around the camera unit 100.

The first infrared lamp 210 may be a brightness adjustment infrared lamp to which DC power is supplied without signal input for shooting synchronization with the camera unit 100.

For example, the first infrared lamp 210 may increase an optical modulation contrast by reducing a brightness of infrared light as the distance from the subject decreases, and may reduce an optical modulation contrast by increasing a brightness of infrared light as the distance from the subject increases.

The second infrared lamp 220 may be a lighting infrared lamp that is turned on to shoot a distant subject of the camera unit 100 and is turned off to shoot a near subject of the camera unit 100 depending on the signal input for shooting synchronization with the camera unit 100.

The second infrared lamp 220 may emit infrared light modulated depending on an ambient illuminance in the shooting environment.

In this instance, the second infrared lamp 220 may increase an optical modulation level of the infrared light as the ambient illuminance decreases, and may reduce the optical modulation level of the infrared light as the ambient illuminance increases.

An embodiment of the present disclosure may include a lamp controller that controls the first infrared lamp 210 to modulate infrared light based on a distance from the subject.

The lamp controller may include a distance sensor 412 for sensing a distance from the subject, and an intensity controller for controlling the first infrared lamp 210 to modulate an intensity of infrared light based on the distance from the subject.

For example, the distance sensor 412 may include at least one of a time of flight (ToF)(or infrared) sensor and an ultrasonic sensor, but is not limited thereto.

The intensity controller may be turned off in a day mode in which a measured illuminance is greater than or equal to a predetermined illuminance in the shooting environment, and may be turned on in a night mode in which the measured illuminance is less than the predetermined illuminance in the shooting environment to control the first infrared lamp 210.

Next, the luminosity multiplexing unit 400 may generate an optical multiplexing signal to control infrared light modulation of the second infrared lamp 220 and a transmittance of the optical filter unit 300 based on the shooting environment.

The luminosity multiplexing unit 400 may include an illuminance sensor for sensing the ambient illuminance in the shooting environment, and a controller that generate the optical multiplexing signal to control the infrared light modulation of the second infrared lamp 220 and the transmittance of the optical filter unit 300 based on the ambient illuminance.

The controller may include a transmittance controller for controlling the transmittance of the optical filter unit 300 based on the ambient illuminance, the intensity controller for controlling the second infrared lamp 220 to modulate the intensity of infrared light based on the ambient illuminance, a timing controller for controlling signal timing to synchronize a shooting period of the camera unit 100, an infrared light modulation period of the second infrared lamp 220, and a transmittance change period of the optical filter unit 300, and a multiplexing signal generator for generating a multiplexing signal in response to control signals of the transmittance controller, the intensity controller, and the timing controller.

When the luminosity multiplexing unit 400 generates the optical multiplexing signal, the luminosity multiplexing unit 400 may calculate an optical modulation contrast value for controlling the transmittance of the optical filter unit 300 or an optical modulation contrast value for controlling the infrared light modulation of the second infrared lamp 220 based on the ambient illuminance of the shooting environment, may generate a timing pulse for synchronizing the shooting period of the camera unit 100 with the transmittance change period of the optical filter unit 300 or a timing pulse for synchronizing the shooting period of the camera unit 100 with the infrared light modulation period of the second infrared lamp 220, may calculate a minimum transmission level corresponding to the ambient illuminance or a maximum brightness level of infrared light, may calculate an optical multiplexing signal function based on the optical modulation contrast value, the timing pulse, and the minimum transmission level or the maximum brightness level of infrared light, and may generate an optical multiplexing signal based on the calculated optical multiplexing signal function.

For example, when the luminosity multiplexing unit 400 calculates the optical multiplexing signal function, the luminosity multiplexing unit 400 may recognize the day mode when the ambient illuminance in the shooting environment is greater than or equal to the predetermined illuminance, may calculate the optical modulation contrast value for controlling the transmittance of the optical filter unit 300 based on the ambient illuminance when the day mode is recognized, may generate the timing pulse for synchronizing the shooting period of the camera unit 100 with the transmittance change period of the optical filter unit 300, may calculate the minimum transmission level corresponding to the ambient illuminance, may calculate the optical multiplexing signal function based on the optical modulation contrast value, the timing pulse, and the minimum transmission level, and may generate the optical multiplexing signal based on the calculated optical multiplexing signal function.

The minimum transmission level may be a lowest transmittance ratio that is relatively set with respect to a maximum open transmittance of the optical filter unit during the daytime.

In this instance, the luminosity multiplexing unit 400 may calculate the optical multiplexing signal function of the day mode using an equation of 'optical multiplexing signal function=(1−minimum transmission level)×(timing pulse)×(optical modulation contrast value)'.

Further, when the luminosity multiplexing unit 400 calculates the optical multiplexing signal function, the luminosity multiplexing unit 400 may recognize the night mode when the ambient illuminance in the shooting environment is less than the predetermined illuminance, may calculate the optical modulation contrast value for controlling the infrared light modulation of the second infrared lamp 220 based on the ambient illuminance when the night mode is recognized, may generate the timing pulse for synchronizing the shooting period of the camera unit 100 with the infrared light modulation period of the second infrared lamp 220, may calculate the maximum brightness level of infrared light, may calculate the optical multiplexing signal function based on the optical modulation contrast value, the timing pulse, and the maximum brightness level of infrared light, and may generate the optical multiplexing signal based on the calculated optical multiplexing signal function.

The luminosity multiplexing unit 400 may calculate the optical multiplexing signal function using an equation of 'optical multiplexing signal function=(maximum brightness level of infrared light)×(timing pulse)×(optical modulation contrast value)'.

An embodiment of the present disclosure may further include a day/night switch that is switched to the day mode, in which the transmittance of the optical filter unit 300 is controlled, or is switched to the night mode, in which the infrared light modulation of the first and second infrared lamps 210 and 220 is controlled, depending on the ambient illuminance in the shooting environment.

The day/night switch may be switched to the day mode so that when the day mode is switched on, the day/night switch applies the optical multiplexing signal generated by the luminosity multiplexing unit 400 to the optical filter unit 300 when the ambient illuminance in the shooting environment is greater than or equal to the predetermined illuminance, and controls the transmittance of the optical filter unit 300.

The day/night switch may be switched to the night mode so that when the night mode is switched on, the day/night switch applies the optical multiplexing signal generated by the luminosity multiplexing unit 400 to the second infrared lamp 220 when the ambient illuminance in the shooting environment is less than the predetermined illuminance to control the infrared light modulation of the second infrared lamp 220, and applies a switching signal to the intensity controller 423 of the lamp controller to control the infrared light modulation of the first infrared lamp 210.

Next, the image storage unit 600 may store at least one of a multi-light image of a visible light band and a multi-light image of an infrared light band that are shot by the camera unit 100.

The image processing unit 500 may fuse and process one of multi-light images of a visible light band, multi-light images of an infrared light band, and multi-light images of a composite band including both visible light and infrared light according to the shooting environment.

For example, the shooting environment may include a first shooting environment in which a daylight condition is daytime, a second shooting environment that is night time of a dark or weak lighting condition, and a third shooting environment which is a moving shooting condition or an ordinary condition with a condition in which there is a severe change in lighting and external light.

The image processing unit 500 may fuse and process a high exposure image and a low exposure image from multi-light images of the visible light band when the shooting environment is the first shooting environment, may fuse and process a high exposure image and a low exposure image from multi-light images of the infrared light band when the shooting environment is the second shooting environment, and may fuse and process a high exposure image and a low exposure image from multi-light images of the composite band including both visible light and infrared light when the shooting environment is the third shooting environment.

As described above, the embodiment illustrated in FIG. 1 may apply a single sensor (broadband) camera, shoot and synchronize changes in an incident amount of visible light using the optical filter, and use a lighting IR lamp and an adjustable IR lamp.

The embodiment illustrated in FIG. 5 may apply a dual sensor (visible light and near infrared light) camera, shoot and synchronize changes in an emission amount of the IR lamp using the beam splitter and the timing control, and use a lighting IR lamp and an adjustable IR lamp.

In the embodiment illustrated in FIG. 5, the optical filter is not attached to the beam splitter and is positioned on a front surface of a visible light camera.

This reason is that a visible light image directly passes through the optical filter on an optical path.

In addition, since the IR image does not pass through the optical filter, the IR light efficiency can increase.

However, the IR lamp requires synchronization with camera shooting and may be implemented through the luminosity multiplexing unit, and a principle of multiplexing the visible light and IR images is the same as the embodiment of FIG. 1.

Here, the optical multiplexing signal function of the luminosity multiplexing unit 400 may be generated from the day mode as in the above Equation 1 at an illuminance greater than or equal to a reference illuminance, and may be generated from the night mode as in the above Equation 2 at an illuminance less than or equal to the reference illuminance.

In this case, in a bright environment, multi-light shooting centered on a visible light image is executed, and at the same time a single IR image or multiple IR images may be shot separately from this. In a dark environment, multi-light shooting centered on an IR image is executed, and at the same time a single visible light image or multiple visible light images with a maximum transmittance may be shot separately from this.

The embodiment illustrated in FIG. 5, as a dual camera system, may be operated at all times, and a multi-level visible light image and an IR image, etc. may be simultaneously stored in the image storage unit 600.

When an image fusion is performed, a multi-exposure visible light image fusion may be useful during the daytime with strong external light or at night with sufficient illumination light, and an IR image fusion may be useful in an environment without lighting or in an environment with a low illuminance (night mode).

When lighting light (building lights, vehicle headlights) exists irregularly even at night, or when outside light is insufficient in hallways or indoors even during the daytime, or when it becomes suddenly dark (dark+partially strong outside light) while moving indoors or underground, or when strong lighting (vehicle headlights, building interior lights) is turned on at night, or when the image is locally brightened by strong lighting, it is possible to fuse a composite band HDR image from ordinary multi-images in the visible and IR bands, and perform image reproduction without local light shortage and saturation phenomenon.

Three examples of the image fusion are below.

First, in the case of daytime (daylight conditions), a fusion (IR blocking) of multi-exposure visible light images may be performed using an optical filter and a visible light camera.

Second, in the case of night time (dark or low light conditions), a fusion (IR pass) of multi-IR band images may be performed using an optical filter, an IR camera, and an IR lamp.

Third, in the case of ordinary conditions (moving shooting, lighting, and severe change in external light), an IR image and a visible light composite image may be fused using an optical filter, a visible light-IR camera, and an IR lamp.

For example, in the case of a shooting environment where a shutter speed of a night surveillance camera is set slowly due to a small amount of average incident light, and there is a sudden change in light (vehicle headlight) or an introduction of strong indoor light, the existing method cannot overcome a local saturation phenomenon of strong visible light only by IR multiplexing. However, the method according to the present disclosure can improve the local saturation phenomenon by performing appropriate exposure of shooting using a visible light camera, and first performing IR image fusion and then secondarily performing fusion of an IR image and a visible light image when fusing multi-exposure images in an averagely dark environment.

Further, in the case of a shooting environment in a tunnel or a shaded place in an averagely bright environment, the ordinary IR image shooting according to the present disclosure allows an image without a shaded area to be fused and reproduced.

In addition, in the case of daytime shooting in bright external light, in a shooting environment where visibility is not secured due to fog or haze, it is possible to reproduce a de-hazing image by simultaneously shooting a visible light multi-image and an IR image (in this case, the IR lamp does not operate).

As described above, a method of acquiring a multi-luminosity image of the multi-luminosity image acquiring device including the camera unit, the lighting unit including the first and second infrared lamps, the lamp controller, the image processing unit, and the luminosity multiplexing unit is as follows.

First, the luminosity multiplexing unit may check whether an image shooting request is received.

The luminosity multiplexing unit may acquire ambient illuminance information in the image shooting request.

Next, the luminosity multiplexing unit may calculate an optical multiplexing signal function for controlling a transmittance of the optical filter unit or calculate an optical multiplexing signal function for controlling infrared light modulation of the second infrared lamp based on the ambient illuminance information to generate an optical multiplexing signal.

The step of generating the optical multiplexing signal may comprise a step of calculating an optical modulation contrast value for controlling the transmittance of the optical filter unit or an optical modulation contrast value for controlling the infrared light modulation of the second infrared lamp based on an ambient illuminance, a step of generating a timing pulse for synchronizing a shooting period of the camera unit with a transmittance change period of the optical filter unit or a timing pulse for synchronizing the shooting period of the camera unit with an infrared light modulation period of the second infrared lamp, a step of calculating a minimum transmission level corresponding to the ambient illuminance or a maximum brightness level of infrared light, a step of calculating an optical multiplexing signal function based on the optical modulation contrast value, the timing pulse, and the minimum transmission level or the maximum brightness level of infrared light, and a step of generating an optical multiplexing signal based on the calculated optical multiplexing signal function.

The step of calculating the optical multiplexing signal function may comprise a step of recognizing a day mode when the ambient illuminance is greater than or equal to a predetermined illuminance, a step of calculating the optical modulation contrast value for controlling the transmittance of the optical filter unit based on the ambient illuminance when the day mode is recognized, a step of generating the timing pulse for synchronizing the shooting period of the camera unit with the transmittance change period of the optical filter unit, a step of calculating the minimum transmission level corresponding to the ambient illuminance, a step of calculating the optical multiplexing signal function based on the optical modulation contrast value, the timing pulse, and the minimum transmission level, and a step of generating the optical multiplexing signal based on the calculated optical multiplexing signal function.

The minimum transmission level may be a lowest transmittance ratio that is relatively set with respect to a maximum open transmittance of the optical filter unit during the daytime.

The step of calculating the optical multiplexing signal function may be calculated by an equation of 'optical multiplexing signal function=(1−minimum transmission level)×(timing pulse)×(optical modulation contrast value)'.

The step of calculating the optical multiplexing signal function may comprise a step of recognize a night mode when the ambient illuminance is less than the predetermined illuminance, a step of calculating the optical modulation contrast value for controlling the infrared light modulation of the second infrared lamp based on the ambient illuminance when the night mode is recognized, a step of generating the timing pulse for synchronizing the shooting period of the camera unit with the infrared light modulation period of the second infrared lamp, a step of calculating the maximum brightness level of infrared light, a step of calculating the optical multiplexing signal function based on the optical modulation contrast value, the timing pulse, and the maximum brightness level of infrared light, and a step of generating the optical multiplexing signal based on the calculated optical multiplexing signal function.

The step of calculating the optical multiplexing signal function may be calculated by an equation of 'optical multiplexing signal function=(maximum brightness level of infrared light)×(timing pulse)×(optical modulation contrast value)'.

Subsequently, a day/night switch may be switched to the day mode or the night mode depending on the ambient illuminance information.

A step of switching to the day mode or the night mode may comprise a step of switching to the day mode so that when the day mode is switched on, the day/night switch applies the optical multiplexing signal generated by the luminosity multiplexing unit to the optical filter unit when the ambient illuminance is greater than or equal to the predetermined illuminance, and controls the transmittance of the optical filter unit.

The step of switching to the day mode or the night mode may comprise a step of switching to the night mode so that when the night mode is switched on, the day/night switch applies the optical multiplexing signal generated by the luminosity multiplexing unit to the second infrared lamp when the ambient illuminance is less than the predetermined illuminance to control the infrared light modulation of the second infrared lamp, and applies a switching signal to the lamp controller to control an infrared light modulation of the first infrared lamp.

Next, when the day/night switch is switched to the day mode, the optical filter unit may modulate a transmittance of light incident in response to the optical multiplexing signal.

Further, when the day/night switch is switched to the night mode, the second infrared lamp may modulate and emit infrared light in response to the optical multiplexing signal, and the first infrared lamp may modulate and emit infrared light correspondingly to a distance from a subject in response to control signals of the lamp controller.

Subsequently, the camera unit may shoot multi-luminosity images for time required to modulate the transmittance of the optical filter unit or for time required to modulate and emit the infrared light of the first and second infrared lamps.

A step of shooting the multi-luminosity images may comprise shooting and storing multi-light images of a visible light band for time required to modulate the transmittance of the optical filter unit and shooting and storing multi-light images of an infrared light band for time required to modulate and emit the infrared light of the first and second infrared lamps.

The image processing unit may fuse and process the shoot multi-luminosity images.

When the image processing unit fuses and processes the shoot multi-luminosity images, the image processing unit may fuse and process one of multi-light images of a visible light band, multi-light images of an infrared light band, and multi-light images of a composite band including both visible light and infrared light according to the shooting environment.

For example, the shooting environment may include a first shooting environment in which a daylight condition is daytime, a second shooting environment that is night time of a dark or weak lighting condition, and a third shooting environment which is a moving shooting condition or an ordinary condition with a condition in which there is a severe change in lighting and external light, but is not limited thereto.

The image processing unit may fuse and process a high exposure image and a low exposure image from multi-light images of the visible light band when the shooting environment is the first shooting environment, may fuse and process a high exposure image and a low exposure image from multi-light images of the infrared light band when the shooting environment is the second shooting environment, and may fuse and process a high exposure image and a low exposure image from multi-light images of the composite band including both visible light and infrared light when the shooting environment is the third shooting environment.

The existing HDR image fusion may fuse images shot at multi-exposure to reproduce a HDR image in order to overcome a limited dynamic luminance range of a visible light band of a camera sensor. However, the present disclosure can present a composite HDR image fusion method using a multi-intensity and multi-band image.

The present disclosure may adjust visible light exposure of the sensor to acquire and fuse a multi-exposure image, may adjust an intensity of IR light to acquire and fuse a multi-IR image, and may fuse an image of visible light band and an image of IR band to reproduce a broadband image in order to improve the image expression at night with irregular lighting.

The present disclosure can sense both a near object and a distant object by multi-shooting and fusing an image from which IR is blocked and an image which passes through IR.

A composite HDR image fusion method according to the present disclosure may be a method for first fusing a multi-exposure image of a visible light band and a multi-lighting image of an IR light band and secondarily composite-fusing a visible HDR image and an IR HDR image.

As described above, the present disclosure can implement an image fusion capable of visually identifying and recognizing objects in various lighting environments by performing a binary luminosity multiplexing method for adjusting a brightness ratio using transmittance adjustment of an optical filter and intensity adjustment of an infrared lighting.

The present disclosure can be manufactured easily using a low-cost sensor by acquiring distance information from a subject from a distance sensor and acquiring shooting environment information from an illuminance sensor.

The present disclosure can overcome a phenomenon of underexposure or partial overexposure of light experienced in an image in various environments such as day and night by acquiring a composite band multi-image using a modulation in a light intensity of a visible band and a near-infrared band and fusing it and a high dynamic range (HDR) visual image.

The present disclosure can respond in real time to changes in external light in various places by proposing a method for modulating a luminosity of shooting incident light using the control of a light-adaptive optical filter and an IR lamp.

The present disclosure can be easily extended and grafted to a mobile camera system that can be mounted on vehicles, robots, drones, etc. as well as fixed CCTV cameras and can be manufactured at low cost.

As described above, the present disclosure can acquire a wide dynamic range (WDR) image in multi-intensity and band for visible light and IR light together with fixed and mobile surveillance camera systems and can be actively used in various image visualization fields including a recently emerging field of object recognition, such as various image signal processing fields to express, autonomous vehicles, and unmanned drones.

In particular, a change in external light generated while shooting an autonomous driving image may frequently occur when it is outside a recognition range of a general sensor, for example, when entering or escaping an underground or a tunnel, or when looking out from the inside or in the opposite situation, or when there is a change in a strong vehicle headlight in a dark parking lot.

A sensor-based driving situation detection area in an autonomous vehicle system is a process of recognizing the external environment, and is an essential element for recognizing a fixed or moving object or recognizing a path.

In this instance, the protection of life and property by recognizing unexpected situations occurring in real time and preventing collisions should be prioritized over any other advanced functions.

In addition, the present disclosure can meet a need for surveillance and security that is increasing worldwide due to the currently increasing social tension and crime, and can implement a high efficiency video surveillance system.

The present disclosure can be utilized in social crime prevention, industry, and broadcasting fields.

That is, the present disclosure can be utilized in the industrial field in which security CCTV, vehicle-mobile phone-drone camera, black box market, and image sensors are utilized, and can also be utilized in the field of image signal processing based on video or in the field of image signal processing for broadcasting.

In addition, the present disclosure can be utilized in related studies and research fields.

That is, the present disclosure will contribute to the development of intelligent image analysis technology such as image fusion field, object search, face search, environment monitoring, etc., can be utilized as an alternative technology capable of improving the hardware performance of the existing limited performance image sensor, can help the development of related technologies in the future as research result data and simulation data in the form of reports and thesis, and is expected to be utilized in high-tech fields such as airports, ports, military facilities, and construction sites.

The features, structures, effects, etc. of the present disclosure described above are included in at least one embodiment of the present disclosure, and are not necessarily limited to only one embodiment. Furthermore, the features, structures, effects, etc. illustrated in each embodiment can be combined or modified for other embodiments by those skilled in the art to which embodiments pertain. Accordingly, the contents related to these combinations and modifications should be interpreted as being included in the scope of the present disclosure.

It is apparent to those skilled in the art that the present disclosure can be embodied in other specific forms without departing from the spirit and essential features of the present disclosure. Accordingly, the aforementioned detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

DESCRIPTION OF REFERENCE NUMERALS

100: camera unit
200: lighting unit
300: optical filter unit
400: luminosity multiplexing unit
500: image processing unit
600: image storage unit

The invention claimed is:

1. A multi-luminosity image acquiring device comprising:
a camera unit configured to shoot a predetermined subject and acquire an image;
a lighting unit around the camera unit, the lighting unit including a first infrared lamp configured to modulate and emit infrared light depending on a distance from the subject, and a second infrared lamp configured to modulate and emit infrared light depending on an illuminance environment;
an optical filter unit on a front surface of the camera unit and configured to adjust a transmission amount of light incident on the camera unit;
a lamp controller configured to control the first infrared lamp to modulate the infrared light based on the distance from the subject;
a luminosity multiplexing unit configured to generate an optical multiplexing signal that modulates the infrared light of the second infrared lamp and controls a transmittance of the optical filter unit based on the illuminance environment; and
an image processing unit configured to fuse and process multiple images.

2. The multi-luminosity image acquiring device of claim 1, wherein the camera unit includes a broadband camera configured to shoot a broadband image including both visible light and infrared light.

3. The multi-luminosity image acquiring device of claim 1, wherein the camera unit is configured to shoot a multi-light image of a visible light band or a multi-light image of an infrared light band depending on a shooting environment.

4. The multi-luminosity image acquiring device of claim 3, wherein
the camera unit is configured to shoot the multi-light image of the visible light band when a measured illuminance is greater than or equal to a predetermined illuminance in the shooting environment, and
the camera unit is configured to shoot the multi-light image of the infrared light band when the measured illuminance is less than the predetermined illuminance in the shooting environment.

5. The multi-luminosity image acquiring device of claim 1, wherein the camera unit includes:
a beam splitter configured to split incident light into a visible light band and an infrared light band;
a first camera configured to shoot a multi-light image of the split visible light band; and
a second camera configured to shoot a multi-light image of the split infrared light band.

6. The multi-luminosity image acquiring device of claim 5, wherein the optical filter unit includes a fixed optical filter that is between a light splitting surface of the beam splitter and the first camera and is configured to adjust a transmission amount of visible light incident on the first camera.

7. The multi-luminosity image acquiring device of claim 5, wherein the first and second cameras are arranged perpendicular to each other with respect to the light splitting surface of the beam splitter.

8. The multi-luminosity image acquiring device of claim 1, wherein the lamp controller includes:
a distance sensor configured to sense the distance from the subject; and
an intensity controller configured to control the first infrared lamp to modulate an intensity of the infrared light based on the distance from the subject.

9. The multi-luminosity image acquiring device of claim 8, wherein the distance sensor includes at least one of a time of flight (ToF) sensor and an ultrasonic sensor.

10. The multi-luminosity image acquiring device of claim 8, wherein
the intensity controller is configured to be turned off in a day mode in which a measured illuminance is greater than or equal to a predetermined illuminance in a shooting environment, and
the intensity controller is configured to be turned on in a night mode, in which the measured illuminance is less than the predetermined illuminance in the shooting environment, to control the first infrared lamp.

11. The multi-luminosity image acquiring device of claim 1, wherein the luminosity multiplexing unit includes:
an illuminance sensor configured to sense an ambient illuminance in a shooting environment; and
a controller configured to generate the optical multiplexing signal to control the infrared light modulation of the second infrared lamp and the transmittance of the optical filter unit based on the ambient illuminance.

12. The multi-luminosity image acquiring device of claim 11, wherein the illuminance sensor includes at least one of a cadmium sulfide (CdS) element and a solar cell panel.

13. The multi-luminosity image acquiring device of claim 11, wherein the controller includes:
- a transmittance controller configured to control the transmittance of the optical filter unit based on the ambient illuminance;
- an intensity controller configured to control the second infrared lamp to modulate an intensity of the infrared light based on the ambient illuminance;
- a timing controller configured to control a signal timing to synchronize a shooting period of the camera unit, an infrared light modulation period of the second infrared lamp, and a transmittance change period of the optical filter unit; and
- a multiplexing signal generator configured to generate the optical multiplexing signal in response to control signals of the transmittance controller, the intensity controller, and the timing controller.

14. The multi-luminosity image acquiring device of claim 1, wherein when the luminosity multiplexing unit generates the optical multiplexing signal, the luminosity multiplexing unit is configured to:
- calculate an optical modulation contrast value for controlling the transmittance of the optical filter unit or an optical modulation contrast value for controlling the infrared light modulation of the second infrared lamp based on an ambient illuminance in a shooting environment;
- generate a timing pulse for synchronizing a shooting period of the camera unit with a transmittance change period of the optical filter unit or a timing pulse for synchronizing the shooting period of the camera unit with an infrared light modulation period of the second infrared lamp;
- calculate a minimum transmission level corresponding to the ambient illuminance or a maximum brightness level of the infrared light of the second infrared lamp;
- calculate an optical multiplexing signal function based on the optical modulation contrast value, the timing pulse, and the minimum transmission level or the maximum brightness level of the infrared light of the second infrared lamp; and
- generate the optical multiplexing signal based on the calculated optical multiplexing signal function.

15. The multi-luminosity image acquiring device of claim 1, further comprising:
- a day/night switch configured to be switched to a day mode, in which the transmittance of the optical filter unit is controlled, or configured to be switched to a night mode, in which the infrared light modulation of the first and second infrared lamps is controlled, depending on an ambient illuminance in a shooting environment.

16. The multi-luminosity image acquiring device of claim 15, wherein when the day/night switch is switched to the day mode so that when the day mode is switched on, the day/night switch is configured to apply the optical multiplexing signal generated by the luminosity multiplexing unit to the optical filter unit when the ambient illuminance in the shooting environment is greater than or equal to a predetermined illuminance, and controls the transmittance of the optical filter unit.

17. The multi-luminosity image acquiring device of claim 16, wherein when the day/night switch is switched to the night mode so that when the night mode is switched on, the day/night switch is configured to apply the optical multiplexing signal generated by the luminosity multiplexing unit to the second infrared lamp when the ambient illuminance in the shooting environment is less than the predetermined illuminance to control the infrared light modulation of the second infrared lamp, and is configured to apply a switching signal to the lamp controller to control the infrared light modulation of the first infrared lamp.

18. The multi-luminosity image acquiring device of claim 1, further comprising:
- an image storage unit configured to store at least one of a multi-light image of a visible light band and a multi-light image of an infrared light band that are shot by the camera unit,
- wherein the image processing unit is configured to fuse and process one of the multi-light image of the visible light band, the multi-light images of the infrared light band, and a composite multi-light image of a composite band including both the visible light and the infrared light according to a shooting environment.

19. The multi-luminosity image acquiring device of claim 18, wherein the shooting environment includes a first shooting environment in which a daylight condition is daytime, a second shooting environment that is night time of a dark or weak lighting condition, and a third shooting environment which is a moving shooting condition or an ordinary condition with a condition in which there is a severe change in lighting and external light.

20. The multi-luminosity image acquiring device of claim 19, wherein
- when the shooting environment is the first shooting environment, the image processing unit is configured to fuse and process a high exposure image and a low exposure image from the multi-light image of the visible light band,
- when the shooting environment is the second shooting environment, the image processing unit is configured to fust and process a high exposure image and a low exposure image from the multi-light image of the infrared light band, and
- when the shooting environment is the third shooting environment, the image processing unit is configured to fuse and process a high exposure image and a low exposure image from the composite multi-light image of the composite band including both the visible light and the infrared light.

21. A method of acquiring a multi-luminosity image of a multi-luminosity image acquiring device including a camera unit, a lighting unit including a first infrared lamp and a second infrared lamp, a lamp controller, an image processing unit, and a luminosity multiplexing unit, the method comprising:
- a step in which the luminosity multiplexing unit checks whether an image shooting request is received;
- a step in which the luminosity multiplexing unit acquires ambient illuminance information when the image shooting request is received;
- a step in which the luminosity multiplexing unit calculates an optical multiplexing signal function for controlling a transmittance of an optical filter unit or an optical multiplexing signal function for controlling an infrared light modulation of the second infrared lamp based on the ambient illuminance information to generate an optical multiplexing signal;
- a step in which a day/night switch is switched to a day mode or a night mode depending on the ambient illuminance information so that when the day/night switch is switched to the day mode, the optical filter unit modulates a transmittance of light incident in response to the optical multiplexing signal, and when the day/night switch is switched to the night mode, the second infrared lamp modulates and emits infrared light in response to the optical multiplexing signal and the first infrared lamp modulates and emits infrared light correspondingly to a distance from a subject in response to a control signal of the lamp controller;

a step in which the camera unit shoots multi-luminosity images for time required to modulate the transmittance of the optical filter unit or for time required to modulate and emit the infrared light of each of the first and second infrared lamps; and a step in which the image processing unit fuses and processes the multi-luminosity shooting images.

22. The method of claim 21, wherein the step of generating the optical multiplexing signal comprises:

calculating an optical modulation contrast value for controlling the transmittance of the optical filter unit or an optical modulation contrast value for controlling the infrared light modulation of the second infrared lamp based on an ambient illuminance;

generating a timing pulse for synchronizing a shooting period of the camera unit with a transmittance change period of the optical filter unit or a timing pulse for synchronizing the shooting period of the camera unit with an infrared light modulation period of the second infrared lamp;

calculating a minimum transmission level corresponding to the ambient illuminance or a maximum brightness level of the infrared light of the second infrared lamp;

calculating the optical multiplexing signal function based on the optical modulation contrast value, the timing pulse, and the minimum transmission level or the maximum brightness level of the infrared light of the second infrared lamp; and generating the optical multiplexing signal based on the calculated optical multiplexing signal function.

23. The method of claim 21, wherein the step of calculating the optical multiplexing signal function comprises:

recognizing the day mode when an ambient illuminance is greater than or equal to a predetermined illuminance;

calculating an optical modulation contrast value for controlling the transmittance of the optical filter unit based on the ambient illuminance when the day mode is recognized;

generating a timing pulse for synchronizing a shooting period of the camera unit with a transmittance change period of the optical filter unit;

calculating a minimum transmission level corresponding to the ambient illuminance;

calculating the optical multiplexing signal function based on the optical modulation contrast value, the timing pulse, and the minimum transmission level; and generating the optical multiplexing signal based on the calculated optical multiplexing signal function.

24. The method of claim 23, wherein the minimum transmission level is a lowest transmittance ratio that is relatively set with respect to a maximum open transmittance of the optical filter unit during daytime.

* * * * *